(12) United States Patent
Cohen et al.

(10) Patent No.: US 10,947,399 B2
(45) Date of Patent: Mar. 16, 2021

(54) PIEZO-JETTABLE VARNISH COMPOSITION

(71) Applicant: HP SCITEX LTD., Netanya (IL)

(72) Inventors: Eytan Cohen, Raanana (IL); Alex Trubnikov, Petach Tiqwa (IL); Shimrit Rubin, Netanya (IL); Efrat Soroker, Zur Moshe (IL); Kfir Dar, Netanya (IL); Kobi Cohen, Netanya (IL)

(73) Assignee: HP Scitex LTD., Netanya (IL)

( * ) Notice: Subject to any disclaimer, the term of this patent is extended or adjusted under 35 U.S.C. 154(b) by 0 days.

(21) Appl. No.: 16/496,928

(22) PCT Filed: Apr. 21, 2017

(86) PCT No.: PCT/IB2017/052298
§ 371 (c)(1),
(2) Date: Sep. 23, 2019

(87) PCT Pub. No.: WO2018/193289
PCT Pub. Date: Oct. 25, 2018

(65) Prior Publication Data
US 2020/0024466 A1   Jan. 23, 2020

(51) Int. Cl.
| | | |
|---|---|---|
| *C09D 11/30* | (2014.01) | |
| *B41J 2/14* | (2006.01) | |
| *B41M 7/00* | (2006.01) | |
| *C09D 11/033* | (2014.01) | |
| *C09D 11/107* | (2014.01) | |

(52) U.S. Cl.
CPC .......... *C09D 11/30* (2013.01); *B41J 2/14201* (2013.01); *B41M 7/0018* (2013.01); *C09D 11/033* (2013.01); *C09D 11/107* (2013.01)

(58) Field of Classification Search
CPC ..... C09D 11/30; C09D 11/033; C09D 11/107; B41J 2/14201; B41M 7/0018; B41M 7/0036
USPC ........................................................ 347/101
See application file for complete search history.

(56) References Cited

U.S. PATENT DOCUMENTS

| | | |
|---|---|---|
| 7,576,149 B2 | 8/2009 | Anderson et al. |
| 8,268,064 B2 | 9/2012 | Iu et al. |
| 9,187,667 B2 | 11/2015 | Doumaux et al. |
| 9,228,105 B2 | 1/2016 | Song et al. |

(Continued)

FOREIGN PATENT DOCUMENTS

| | | |
|---|---|---|
| EP | 0896990 | 3/2004 |
| WO | WO-2014021840 | 2/2014 |

OTHER PUBLICATIONS

International Search Report and Written Opinion for International Application No. PCT/IB2017/052298 dated Sep. 8, 2017, 11 pages.

*Primary Examiner* — Huan H Tran
*Assistant Examiner* — Alexander D Shenderov
(74) *Attorney, Agent, or Firm* — HP Inc. Patent Department

(57) ABSTRACT

Herein is described a piezo-jettable varnish composition comprising a latex polymer having a weight averaged molecular weight Mw of greater than about 50 000, a polymeric salt derived from an acidic polymer having a weight averaged molecular weight Mw in the range of about 1000 to about 50 000, water, and a co-solvent, wherein, the latex polymer and polymeric salt are present in amounts such that the ratio of latex polymer to polymeric salt by weight is in the range of greater than about 1:1 to about 8:1.

11 Claims, 2 Drawing Sheets

(56) References Cited

U.S. PATENT DOCUMENTS

| | | |
|---|---|---|
| 9,278,515 B2 | 3/2016 | Sarkisian et al. |
| 2006/0100307 A1 | 5/2006 | Uerz et al. |
| 2008/0068426 A1 | 3/2008 | Roi et al. |
| 2013/0330526 A1 | 12/2013 | Song et al. |
| 2014/0015912 A1 | 1/2014 | Brandstein et al. |
| 2014/0141212 A1* | 5/2014 | Fu .................. B41M 7/0036 428/205 |
| 2015/0080514 A1 | 3/2015 | Song et al. |
| 2015/0105504 A1* | 4/2015 | Verheggen ........... C09D 11/38 524/108 |
| 2015/0152281 A1* | 6/2015 | Iu ..................... C09D 133/00 428/204 |
| 2015/0336400 A1 | 11/2015 | Swei et al. |
| 2015/0353755 A1 | 12/2015 | Czudaj et al. |

\* cited by examiner

PIEZO-JETTABLE VARNISH COMPOSITION

BACKGROUND

Inkjet printers are used in home printing, office printing and commercial printing. The growth of inkjet printing is the result of a number of factors including reductions in cost of inkjet printers and improvements in print resolution and overall print quality. A continued demand in inkjet printing has resulted in the need to produce images of high quality, high permanence and high durability while maintaining a reasonable cost. Inkjet printing is a popular method of non-contact printing on a broad selection of substrates.

Printed images may be protected using overprint varnishes. Existing varnishes include water-based overprint varnishes which may be applied using analogue coating techniques, and UV-curable overprint varnishes which are available as jettable and analogue varnishes.

DETAILED DESCRIPTION

Figure 1:
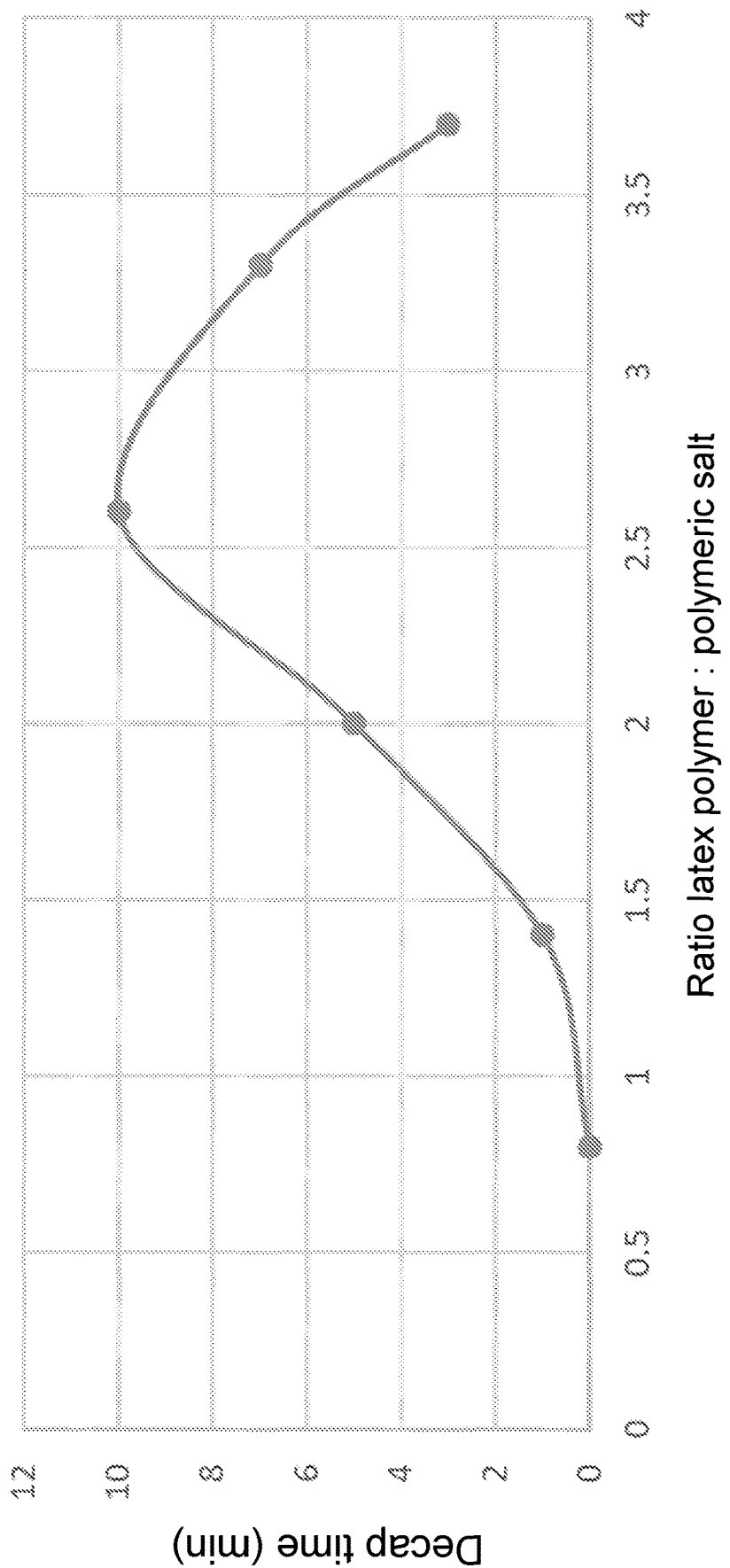
FIG. 1 is a graph showing the effect of the ratio of latex polymer to polymeric salt on the decap performance of a jettable varnish composition.

Before the compositions, methods and related aspects of the disclosure are disclosed and described, it is to be understood that this disclosure is not restricted to the particular process features and materials disclosed herein because such process features and materials may vary somewhat. It is also to be understood that the terminology used herein is used for the purpose of describing particular examples. The terms are not intended to be limiting because the scope is intended to be limited by the appended claims and equivalents thereof.

It is noted that, as used in this specification and the appended claims, the singular forms "a," "an," and "the" include plural referents unless the context clearly dictates otherwise.

The term "decap" is a measure of how long a printing nozzle may remain inactive before plugging. One way of determining "decap" of a jettable printing composition is determining how many nozzles stop firing after a specific time interval during which the printhead remains idle (i.e. after a specific time interval over which no varnish composition is jetted from the nozzles of a printing apparatus, for example an inkjet printing apparatus).

The term "piezo-jettable" used herein is used to refer to a composition that may be jetted from a piezo-actuated printhead. A piezo-actuated printhead may include a substrate defining a fluid chamber, a flexible membrane supported by the substrate over the fluid chamber, and an actuator provided on the flexible membrane. In one arrangement, the actuator includes a piezoelectric material which deforms when an electrical voltage is applied. As such, when the piezoelectric material deforms, the flexible membrane deflects thereby causing ejection of fluid (e.g. varnish composition) from the fluid chamber and through an orifice communicated with the fluid chamber.

As used herein, "latex," "latex polymer," or "latex particles" refer to the polymeric particles (e.g. synthesized from individual monomers), which are dispersed in a liquid vehicle, i.e. an aqueous medium in the aqueous compositions described herein, forming a latex dispersion. The term "latex" generally refers to liquid, e.g. aqueous medium, and polymeric particles that are dispersed within the liquid. However, when a latex (i.e. a latex dispersion including latex polymer particles) is added to a varnish composition, the liquid becomes part of the liquid vehicle of the composition (i.e. the aqueous medium, e.g. water, in the aqueous compositions described herein), and thus, latex polymer can be described based on the latex particle or latex polymer solids that remain dispersed in the liquid vehicle.

The term "latex polymer dispersion" or "latex dispersion" includes both latex particulates as well as the aqueous medium in which the latex particulates are dispersed. More specifically, a latex dispersion is a liquid suspension comprising a liquid (such as water and/or other liquids) and polymeric particulates from 20 nm to 200 nm in size (average particle size), and having a weight average molecular weight from about 50,000 Mw to about 2,000,000 Mw (for example, from about 100,000 Mw to about 300,000 Mw). Such polymeric particulates can comprise a plurality of monomers that are typically randomly polymerized. The average particle size (e.g. volume or intensity weighted average particle size) may be determined by dynamic light scattering.

As used herein, the term "polymeric salt" refers to a salt formed by the neutralisation of an acidic polymer by an alkali.

As used herein, the term "jettable" is used to refer to a composition that may be jetted, for example from the nozzles of a printhead, such as a piezo-printhead (i.e. "piezo-jettable"), for examples such as the nozzles of a printhead provided in an inkjet printing apparatus.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight range of about 1% to about 20% should be interpreted to include not only the explicitly recited limits of 1% to about 20%, but also to include individual amounts such as 2%, 3%, 4%, and sub-ranges such as 5% to 15%, 10% to 20%, etc.

Unless otherwise stated, any feature described herein can be combined with any aspect or any other feature described herein.

Existing overprint varnishes require analogue printing and/or curing. These processes have been found to further complicate and increase the cost of processes involving the inkjet printing of images, due to the need for separate varnishing and/or curing stations. UV-curable overprint varnishes may also be problematic for environmental reasons.

The present inventors have also found that the coating of printed images using analogue techniques may lead to further problems such as the glueability of printed packing materials, for example corrugated boards, which have been varnish coated.

Therefore, the present inventors have investigated providing aqueous jettable overcoat varnishes that can be selectively applied to a printed substrate, for example to leave areas without varnish which to which glue can be applied, while overcoming difficulties such as providing a composition with a high solid content to provide desirable varnish performance, for example in terms of durability and/or gloss etc., along with excellent film forming properties and excellent decap performance.

The present inventors have found that the aqueous varnish compositions described herein may be provided with a high solid content and also be jetted using a piezo printhead due to their excellent decap performance.

In an aspect there is provided a piezo-jettable varnish composition comprising:
  a latex polymer;
  a polymeric salt;
  water; and
  a co-solvent,
wherein, the latex polymer and polymeric salt are present in amounts such that the ratio of latex polymer to polymeric salt by weight is in the range of greater than about 1:1 to about 8:1.

In an aspect there is provided a piezo-jettable varnish composition comprising:
  a latex polymer having a weight averaged molecular weight Mw of greater than about 50 000;
  a polymeric salt derived from an acidic polymer having a weight averaged molecular weight Mw in the range of about 1000 to about 50 000;
  water; and
  a co-solvent,
wherein, the latex polymer and polymeric salt are present in amounts such that the ratio of latex polymer to polymeric salt by weight is in the range of greater than about 1:1 to about 8:1.

In an aspect there is provided a printing method comprising:
  providing a printed substrate comprising a print substrate on which a printed image is disposed;
  providing a piezo-jettable varnish composition;
  piezo-inkjet printing the piezo jettable varnish composition onto the printed substrate to provide a varnish layer disposed on the printed image,
wherein the piezo-jettable varnish composition comprises:
  a latex polymer;
  a polymeric salt;
  water; and
  a co-solvent,
wherein, the latex polymer and polymeric salt are present in amounts such that the ratio of latex polymer to polymeric salt by weight is in the range of greater than about 1:1 to about 8:1.

In an aspect there is provided a printing method comprising:
  providing a printed substrate comprising a print substrate on which a printed image is disposed;
  providing a piezo-jettable varnish composition;
  piezo-inkjet printing the piezo jettable varnish composition onto the printed substrate to provide a varnish layer disposed on the printed image,
wherein the piezo-jettable varnish composition comprises:
  a latex polymer having a weight averaged molecular weight Mw of greater than about 50 000;
  a polymeric salt derived from an acidic polymer having a weight averaged molecular weight Mw in the range of about 1000 to about 50 000;
  water; and
  a co-solvent,
wherein, the latex polymer and polymeric salt are present in amounts such that the ratio of latex polymer to polymeric salt by weight is in the range of greater than about 1:1 to about 8:1.

In an aspect there is provided a piezo-actuatable printhead comprising: a fluid chamber comprising a piezo-jettable varnish composition; and an orifice in fluid communication with the fluid chamber such that the varnish composition is jettable from the orifice, the piezo-jettable varnish composition comprising:
  a latex polymer;
  a polymeric salt;
  water; and
  a co-solvent,
wherein, the latex polymer and polymeric salt are present in amounts such that the ratio of latex polymer to polymeric salt by weight is in the range of greater than about 1:1 to about 8:1.

In an aspect there is provided a piezo-actuatable printhead comprising: a fluid chamber comprising a piezo-jettable varnish composition; and an orifice in fluid communication with the fluid chamber such that the varnish composition is jettable from the orifice, the piezo-jettable varnish composition comprising:
  a latex polymer having a weight averaged molecular weight Mw of greater than about 50 000;
  a polymeric salt derived from an acidic polymer having a weight averaged molecular weight Mw in the range of about 1000 to about 50 000;
  water; and
  a co-solvent,
wherein, the latex polymer and polymeric salt are present in amounts such that the ratio of latex polymer to polymeric salt by weight is in the range of greater than about 1:1 to about 8:1.

Varnish Composition

Described herein is a piezo-jettable varnish composition comprising a latex polymer, a polymeric salt, water, and a co-solvent. In some examples, the latex polymer and polymeric salt are present in the varnish composition in amounts such that the ratio of latex polymer to polymeric salt by weight is in the range of greater than about 1:1 to about 8:1.

In some examples, the varnish composition further comprises a surfactant. In some examples, the varnish composition further comprises a wax. The varnish composition may also contain buffers, biocides, viscosity modifiers, sequestering agents, stabilizing agents, humectants, and combinations thereof.

The varnish compositions described herein are aqueous compositions. Such compositions are environmentally preferable compared to solvent-based or UV curable compositions.

In some examples, the varnish composition has a viscosity in the range of about 5-20 cP, where the viscosity is measured at the jetting temperature (i.e. the temperature at which the composition is to be jetted). In some examples, the jetting temperature is a temperature in the range of about 10° C. to about 50° C., for example about 20-40° C., or about 25° C.

In some examples, the varnish composition has a viscosity of at least about 5 cP at 25° C. In some examples, the varnish composition has a viscosity of up to about 30 cP at 25° C., for example up to about 25 cP at 25° C., or up to about 20 cP at 25° C. In some examples, the varnish composition has a viscosity in the range of about 5-20 cP at 25° C.

The viscosity of the varnish composition may be determined according to ISO3219, DIN.

In some examples, the viscosity of the varnish composition is adjusted by adjusting the amount of water contained in the composition.

In some examples, the varnish composition has a surface tension in the range of about 20-40 dynes/cm, where the surface tension is measured at the jetting temperature (i.e. the temperature at which the composition is to be jetted). In some examples, the jetting temperature is a temperature in the range of about 10° C. to about 50° C., for example about 20-40° C., or about 25° C.

In some examples, the varnish composition has a surface tension of at least about 15 dynes/cm at 25° C., for example at least about 20 dynes/cm at 25° C. In some examples, the varnish composition has a surface tension of up to about 50 dynes/cm at 25° C., for example up to about 45 dynes/cm at 25° C., or up to about 40 dynes/cm at 25° C. In some examples, the varnish composition has a surface tension in the range of about 20 to about 40 dynes/cm at 25° C.

The surface tension of the varnish composition may be determined according to ASTM D1331-89.

In some examples, the varnish composition contains water in an amount of from about 40 wt % to about 90 wt % by total weight of the composition, for example from about 50 wt % to about 85 wt % by total weight of the composition.

In some examples, the jettable varnish composition comprises up to about 50 wt % solids by total weight of the composition, for example, up to about 40 wt % solids, or up to about 30 wt % solids by total weight of the composition. In some examples, the jettable varnish composition comprises at least 5 wt % solids by total weight of the varnish composition, for example at least about 10 wt % solids, or at least about 15 wt % solids by total weight of the varnish composition. In some examples, the varnish composition comprises from about 10 wt % to about 30 wt % solids by total weight of the composition.

As used herein, the term "solids" of the varnish compositions is used to refer to the components of the varnish composition that remain after a varnish image formed by printing a varnish composition is dried, for example following evaporation of water and the co-solvent from the varnish composition. For example, the term "solids" of the varnish composition includes the polymeric salt as well as the latex polymer, even though the polymeric salt is soluble in the aqueous varnish composition. The "solids" of the varnish composition may also include waxes and/or surfactants that may be included in the varnish composition.

The varnish composition may be a transparent (e.g. transparent and colourless) varnish composition, for example having no or substantially no colorant (e.g. pigment) and thus may be a pigment-free, or substantially pigment-free composition. The varnish composition may comprise less than 2 wt % solids of colorant, in some examples less than 1 wt % solids of colorant, in some examples less than 0.5 wt % solids of colorant, in some examples less than 0.1 wt % solids of colorant. A "colorant" may be a material that imparts a color to the composition. As used herein, "colorant" includes pigments and dyes, such as those that impart colors such as black, magenta, cyan and yellow to an ink. As used herein, "pigment" generally includes pigment colorants, magnetic particles, aluminas, silicas, and/or other ceramics or organo-metallics. In some examples, the varnish composition when printed as an overcoat varnish layer over a printed image does not substantially affect the colour of an underprinted image when viewed with the naked eye.

The present inventors have found that the varnish compositions described herein may form films around ambient temperature (e.g. around 25° C.) and are therefore useful to protect underprinted images without requiring additional heating to provide a protective film (e.g. a continuous (i.e. uncracked) film) from the varnish composition. In some examples, the varnish composition has a minimum film formation temperature (MFFT) of up to about 40° C., in some examples up to about 30° C. or up to about 25° C. In some examples, the varnish composition has a MFFT in the range of about 10° C. to about 40° C., for example about 10° C. to about 30° C., about 15° C. to about 30° C., or about 20° C. to about 30° C. In some examples, the varnish composition has a MFFT of about 25° C. The MFFT of a varnish composition may be determined using a MFFT 90 Minimum Film Forming Temperature Instrument (available from Rhopoint™ Instruments). The MFFT of a varnish composition may be determined according to ASTM D2354.

Latex Polymer

The latex polymer may have a weight averaged molecular weight Mw of greater than about 50 000.

In some examples, the jettable varnish composition comprises at least about 1 wt % latex polymer by total weight of the composition, for example at least about 2 wt %, at least about 3 wt %, at least about 5 wt %, or at least about 8 wt % of the total weight of the varnish composition.

In some examples, the jettable varnish composition comprises up to about 45 wt % latex polymer by total weight of the composition, for example up to about 40 wt %, up to about 35 wt %, up to about 30 wt %, up to about 25 wt %, up to about 20 wt %, up to about 15 wt %, or up to about 10 wt % of the total weight of the varnish composition.

In some examples, the jettable varnish composition comprises from about 1 wt % latex polymer to about 40 wt % latex polymer by total weight of the composition, for example about 5 wt % to about 25 wt % latex polymer by total weight of the composition.

In some examples, the latex polymer has a weight average molecular weight of greater than about 100,000 Mw. In some examples, the latex polymer has a weight average molecular weight of up to about 2,000,000 Mw, for example up to about 2,000,000 Mw, up to about 500,000 Mw, up to about 300,000 Mw, or up to about 250,000 Mw. In some examples, the latex polymer has a weight average molecular weight in the range of about 100,000 Mw to about 300,000 Mw. In some examples, the latex polymer has a weight average molecular weight in the range of about 50,000 Mw to about 250,000 Mw.

In some examples, polymeric particulates of the latex polymer have an average particle size of about 500 nm or less, for example about 200 nm or less, or about 100 nm or less. In some examples, polymeric particulates of the latex polymer have an average particle size of about 20 nm or greater. In some examples, polymeric particulates of the latex polymer have an average particle size in the range of about 20 nm to about 200 nm, for example about 20 nm to about 100 nm. The average particle size (e.g. volume or intensity weighted average particle size) may be determined by dynamic light scattering.

In some examples, the latex polymer has an acid number of less than about 150 mg KOH/g, for example less than about 100 mg KOH/g, less than about 80 mg KOH/g, less than about 70 mg KOH/g, or less than about 50 mg KOH/g.

The acid number of a polymer, as measured in mg KOH/g can be measured using standard procedures known in the art, for example using the procedure described in ASTM D1386.

In some examples, the latex polymer has a weight averaged molecular weight of greater than about 50,000 Mw (e.g. greater than about 100,000 Mw) and an acid number of less than about 150 mg KOH/g (e.g. less than about 100 mg KOH/g, less than about 80 mg KOH/g, less than about 70 mg KOH/g, or less than about 50 mg KOH/g).

In some examples, the latex polymer has a glass transition temperature (Tg) of up to about 100° C., for example up to about 95° C., up to about 90° C., up to about 80° C., up to about 75° C., up to about 70° C., or up to about 65° C. In some examples, the latex polymer has a glass transition temperature (Tg) of about 20° C. or greater, for example about 30° C. or greater, about 40° C. or greater, about 45° C. or greater, or about 50° C. or greater. In some examples, the latex polymer has a glass transition temperature in the range of about 20° C. to about 100° C., for example about 20° C. to about 80° C., or about 30° C. to about 70° C. The glass transition temperature (Tg) of the latex polymer may be determined using DSC (differential scanning calorimetry), for example determined according to ASTM D3418.

The latex polymer may be any latex polymer which may be provided in an aqueous dispersion. For example, the latex polymer may comprise an acrylic polymer (e.g. an acrylic copolymer).

The term "acrylic polymer" is used herein to refer to polymers/copolymers derived from acrylic based monomers, for example, acrylic acid monomers, methacrylic acid monomers, acrylate monomers, methacrylate monomers or combinations thereof.

Acrylic latex polymers may be formed from acrylic monomers and thus, may be said to comprise acrylic monomer residues or methacrylic monomer residues. Examples of monomers of the acrylic latex polymer include, by way of illustration and not limitation, acrylic monomers, such as, for example, acrylate esters, acrylamides, and acrylic acids, and methacrylic monomers, such as, for example, methacrylate esters, methacrylamides, and methacrylic acids. The acrylic latex polymer may be a homopolymer or copolymer of an acrylic monomer and another monomer such as, for example, a vinyl aromatic monomer including, but not limited to, styrene, styrene-butadiene, p-chloromethylstyrene, divinyl benzene, vinyl naphthalene and divinyl naphthalene, for example, such that, in some examples in accordance with the principles described herein, the acrylic latex polymer is a predominantly acrylic polymer. By "predominantly acrylic" is meant that the polymer contains greater than about 50%, or greater than about 55%, or greater than about 60%, or greater than about 70%, or greater than about 80%, or greater than about 90%, by weight, of copolymerized units comprising acrylic monomer residues or methacrylic monomer residues, or combinations thereof.

Examples of acrylate monomers include C1 to C30 alkyl acrylates (e.g. C1 to C20 alkyl acrylates, C1 to C10 alkyl acrylates, or C1 to C8 alkyl acrylates). In some examples, acrylate monomers may be selected from the group comprising methyl acrylate, ethyl acrylate, propyl acrylate, isopropyl acrylate, n-butyl acrylate, iso-butyl acrylate, tert-butyl acrylate, 2-ethylhexyl acrylate, lauryl acrylate, isobornyl acrylate, cyclohexyl acrylate, 3,3,5-trimethylcyclohexyl acrylate, isocane acrylate, glycidyl acrylate, 3,4-epoxycyclohexylmethylacrylate, 2-(3,4-epoxycyclohexyl) ethylacrylate, hydroxyethyl acrylate, hydroxypropyl acrylate, hydroxybutyl acrylate, methacrylic anhydride, diethyleneglycol bisacrylate, 4,4'-isopropylidenediphenol-bisacrylate (Bisphenol A diacrylate), alkoxylated 4,4'-isopropylidenediphenol bisacrylate, trimethylolpropane trisacrylate and alkoxylated trimethylolpropane trisacrylate.

Examples of methacrylate monomers include C1 to C30 alkyl methacrylates (e.g. C1 to C20 alkyl methacrylates, C1 to C10 alkyl methacrylates, or C1 to C8 alkyl methacrylates), ethylene glycol methacrylates and dimethacrytales. In some examples, methacrylate monomers may be selected from the group comprising methyl methacrylate, ethyl methacrylate, propyl methacrylate, isopropyl methacrylate, n-butyl methacrylate, iso-butyl methacrylate, tert-butyl methacrylate, 2-ethylhexyl methacrylate, lauryl methacrylate, isobornyl methacrylate, cyclohexyl methacrylate, 3,3,5-trimethylcyclohexyl methacrylate, isocane methacrylate, glycidyl methacrylate, 3,4-epoxycyclohexylmethylmethacrylate, 2-(3,4-epoxycyclohexyl)ethylmethacrylate, hydroxyethyl methacrylate, hydroxypropyl methacrylate, hydroxybutyl methacrylate, methacrylic anhydride, diethyleneglycol bismethacrylate, 4,4'-isopropylidenediphenol bismethacrylate (Bisphenol A dimethacrylate), alkoxylated 4,4'-isopropylidenediphenol bismethacrylate, trimethylolpropane trismethacrylate and alkoxylated trimethylolpropane trismethacrylate.

In some examples, the latex polymer comprises a (meth) acrylate polymer/copolymer. In some examples, the (meth) acrylate polymer/copolymer may be formed from monomers comprising C1 to C30 alkyl methacrylates (e.g. C1 to C20 alkyl methacrylates, C1 to C10 alkyl methacrylates, or C1 to C8 alkyl methacrylates), C1 to C30 alkyl acrylates (e.g. C1 to C20 alkyl acrylates, C1 to C10 alkyl acrylates, or C1 to C8 alkyl acrylates), ethylene glycol methacrylates, dimethacrytales, methacrylic acids, acrylic acids or combinations thereof.

In some examples, the latex polymer is formed from monomers selected from styrenes, C1 to C30 alkyl methacrylates (e.g. C1 to C20 alkyl methacrylates, C1 to C10 alkyl methacrylates, or C1 to C8 alkyl methacrylates), C1 to C30 alkyl acrylates (e.g. C1 to C20 alkyl acrylates, C1 to C10 alkyl acrylates, or C1 to C8 alkyl acrylates), ethylene glycol methacrylates, dimethacrytales, methacrylic acids, acrylic acids or combinations thereof.

In some examples, the latex polymer is a styrene-acrylic polymer. For example, the latex polymer may be formed from a styrene monomer and a monomer selected from acrylic acids, methacrylic acids, acrylates and methacrylates.

Examples of commercially available resins that may be used as to provide the latex polymer include Joncryl 74-A™, Joncryl 77™, Joncryl 80™, Joncryl 89™, Joncryl 537™, Joncryl 538™, Joncryl 585™, Joncryl 624™, Joncryl 660™ and Joncryl 631 ™ available from BASF™. Other non-limiting examples of resins or polymers that can be used to provide the latex polymer include acrylic resins available commercially from DSM™ Company under the names: NeoCryl® A-1105, NeoCryl® A-1110, NeoCryl® A-2082, NeoCryl® A-2099 and NeoCryl® A-2092; acrylic resins commercially available from Alberdingk-Boley™ Company under the names: Alberdingk® AC 2310, AlberdingkUSA® AC 2389, Alberdingk® AS 2065 VP; and acrylic resins commercially available from Down™ Company under the names: UCAR™ Latex DL 420 G, UCAR™ Latex DL 424 and UCAR™ Latex DL 432 S.

In some examples, the latex polymer constitutes at least about 5 wt % of the total solids content of the varnish composition, for example at least about 10 wt %, at least about 15 wt %, at least about 20 wt %, at least about 25 wt %, at least about 30 wt %, at least about 40 wt %, at least about 50 wt %, at least about 55 wt %, or at least about 60 wt % of the total solids content of the varnish composition. In some examples, the latex polymer constitutes up to about 90 wt % of the total solids content of the varnish composition, for example up to about 85 wt %, up to about 80 wt %, or up to about 75 wt % the total solids content of the varnish composition. In some examples, the latex polymer constitutes from about 10 wt % to about 85 wt % of the total solids content of the varnish composition.

In some examples, the latex polymer is provided to a varnish composition in the form of a latex dispersion which may comprise latex polymer particles dispersed in water.

Polymeric Salt

The polymeric salt may be derived from an acidic polymer, for example an acidic polymer having a weight averaged molecular weight Mw in the range of about 1000 to about 50 000.

As used herein, the term "polymeric salt" refers to a salt formed by the neutralisation of an acidic polymer by an alkali. The polymeric salt is soluble in water and therefore soluble in the varnish compositions described herein. On printing of the varnish compositions described herein, drying of the varnish composition by evaporation of the water and co-solvent leaves the polymeric salt in the varnish layer on the printed substrate.

An acidic polymer may be formed from a composition comprising acidic monomers. Acidic monomers that can be polymerized to form acidic polymers include, acrylic acid, methacrylic acid, ethacrylic acid, dimethylacrylic acid, maleic anhydride, maleic acid, vinylsulfonate, cyanoacrylic acid, vinylacetic acid, allylacetic acid, ethylidineacetic acid, propylidineacetic acid, crotonoic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, aconitic acid, phenylacrylic acid, acryloxypropionic acid, vinylbenzoic acid, N-vinylsuccinamidic acid, mesaconic acid, methacroylalanine, acryloylhydroxyglycine, sulfoethyl methacrylic acid, sulfopropyl acrylic acid, styrene sulfonic acid, sulfoethylacrylic acid, 2-methacryloyloxymethane-1-sulfonic acid, 3-methacryoyloxypropane-1-sulfonic acid, 3-(vinyloxy)propane-1-sulfonic acid, ethylenesulfonic acid, vinyl sulfuric acid, 4-vinylphenyl sulfuric acid, ethylene phosphonic acid, vinyl phosphoric acid, vinyl benzoic acid, 2-acrylamido-2-methyl-1-propanesulfonic acid, combinations thereof, derivatives thereof, and mixtures thereof.

In some examples, the acidic polymer used to form the polymeric salt is formed from a composition comprising acidic monomers such as (meth)acrylic acid monomers. In some examples, the acidic polymer is an acrylic polymer.

In some examples, the acidic polymer is a copolymer formed from a composition comprising acidic monomers and a vinyl monomer. For example, the acidic polymer may be formed from acidic monomers and vinyl monomers selected from vinyl aromatic compounds (e.g. styrene), olefins (e.g. alkylene monomers such as ethylene and polypropylene), acrylates, methacrylates, acrylamides, methacrylamides and combinations thereof.

In some examples, the acidic polymer is a polymer formed from styrene and (meth)acrylic acid.

Examples of commercially available materials that may be used to provide the polymeric salt include Joncryl™ 50, Joncryl™ 60, Joncryl™ 61, Joncryl™ 62, Joncryl™ 63, Joncryl™ ECO 75, Joncryl™ HPD 71 and Joncryl™ HPD 96 available from BASF™; and Neocryl™ BT-21, Neocryl™ XK-39, Neocryl™ BT-107, Neocryl™ BT-24 available from DSM™.

In some examples, the acidic polymer has an acid number of greater than about 120 mg KOH/g, for example greater than about 150 mg KOH/g, greater than about 170 mg KOH/g, greater than about 180 mg KOH/g, or greater than about 200 mg KOH/g. In some examples, the acidic polymer has an acid number in the range of about 120 mg KOH/g to about 400 mg KOH/g, for example about 150 KOH/g to about 300 mg KOH/g. The acid number of a polymer, as measured in mg KOH/g can be measured using standard procedures known in the art, for example using the procedure described in ASTM D1386.

In some examples, the acidic polymer has a weight averaged molecular weight Mw of up to about 50 000, for example up to about 30 000, up to about 25 000, or up to about 20 000. In some examples, the acidic polymer has a weight averaged molecular weight Mw of greater than about 1000, for example greater than about 2000, or greater than about 5000. In some examples, the acidic polymer has a weight averaged molecular weight Mw in the range of about 1000 to about 50 000, for example about 1000 to about 25 000.

In some examples, the acidic polymers has an acid number of greater than about 120 mg KOH/g (for example greater than about 150 mg KOH/g, greater than about 170 mg KOH/g, greater than about 180 mg KOH/g, or greater than about 200 mg KOH/g) and a weight averaged molecular weight Mw of up to about 50 000 (for example up to about 30 000, up to about 25 000, or up to about 20 000).

The polymeric salt is formed by neutralising the acidic polymer with an alkali, such as neutralising the acidic polymer with a neutralising agent. Examples of neutralising agents include triethylamine (TEA), dimethyl ethanolamine (DMEA), triethanolamine, sodium salt, ammonia, ethyl diisopropyl amine (EDIPA). In some examples, the neutralising agent may be ammonia. In some examples, the polymeric salt is an alkylammonium polymeric salt.

In some examples, the jettable varnish composition comprises at least about 1 wt % polymeric salt by total weight of the composition, for example at least about 2 wt %, at least about 3 wt %, or at least about 5 wt % polymeric salt by the total weight of the varnish composition.

In some examples, the jettable varnish composition comprises up to about 25 wt % polymeric salt by total weight of the composition, for example up to about 20 wt %, up to about 15 wt %, or up to about 10 wt % polymeric salt by total weight of the varnish composition.

In some examples, the jettable varnish composition comprises from about 1 wt % latex polymer to about 25 wt % polymeric salt by total weight of the composition, for example about 2 wt % to about 10 wt % polymeric salt by total weight of the composition.

In some examples, the polymeric salt constitutes at least about 1 wt % of the total solids content of the varnish composition, for example at least about 2 wt %, at least about 5 wt %, at least about 10 wt %, at least about 15 wt %, at least about 20 wt %, at least about 25 wt %, at least about 30 wt %, at least about 35 wt %, or at least about 40 wt % of the total solids content of the varnish composition. In some examples, the polymeric salt constitutes up to about 50 wt % of the total solids content of the varnish composition, for example up to about 45 wt %, or up to about 40 wt % the total solids content of the varnish composition. In some examples, the polymeric salt constitutes from about 5 wt % to about 50 wt % of the total solids content of the varnish composition.

Ratio Latex Polymer: Polymeric Salt

The present inventors have found that piezo-jettable varnish compositions may be formed by providing a composition comprising a latex polymer and a polymeric salt (e.g. the water soluble polymeric salt) in particular ratios.

In some examples, the ratio of latex polymer to polymeric salt by weight is greater than about 1:1. In some examples, the ratio of latex polymer to polymeric salt by weight, is about 1.2:1 or greater, for example about 1.4:1 or greater, about 1.5:1 or greater, about 1.7:1 or greater, about 1.8:1 or greater, about 2:1 or greater, about 2.1:1 or greater, about 2.2:1 or greater, or about 2.3:1 or greater.

In some examples, the ratio of latex polymer to polymeric salt by weight is up to about 8:1, for example up to about 7:1, up to about 6.5:1, up to about 6:1, up to about 5:1, up to about 4:1, up to about 3.8:1, up to about 3.7:1, up to about 3.6:1, up to about 3.5:1, up to about 3.4:1, up to about 3.3:1, up to about 3.2:1, up to about 3.1:1, or up to about 3:1.

In some examples, the ratio of latex polymer to polymeric salt by weight is in the range of greater than about 1:1 to about 8:1, for example in the range of greater than about 1:1 to about 4:1. In some examples, the ratio of latex polymer to polymeric salt by weight is in the range of about 1.5:1 to about 4:1, for example about 1.5:1 to about 3.5:1, about 2:1 to about 3.5:1, about 2:1 to about 3:1, or about 2.3:1 to about 3:1.

Co-Solvent

The co-solvent and water of the varnish composition may be described as the 'liquid vehicle' of the jettable varnish composition. In some examples, the liquid vehicle of the varnish composition comprises from about 50 wt % to about 95 wt %, for example from about 60 wt % to about 90 wt % of the composition by total weight of the composition. In some examples, the liquid vehicle comprises water and about 1 wt % to about 70 wt % organic co-solvent, for example water and about 5 wt % to about 50 wt % organic co-solvent.

In some examples, the varnish composition comprises at least about 2 wt % co-solvent by total weight of the composition, for example at least 5 wt %, at least about 10 wt %, at least about 15 wt %, or about 20 wt % co-solvent by total weight of the composition. In some examples, the varnish composition comprises up to about 60 wt % co-solvent by total weight of the composition, for example up to about 50 wt %, up to about 40 wt %, or up to about 30 wt % co-solvent by total weight of the composition.

The co-solvent may be an organic solvent, for example a water soluble organic solvent.

Examples of water soluble organic co-solvents include: aliphatic alcohols, aromatic alcohols, diols, glycol ethers, poly(glycol) ethers, lactams, formamides, acetamides, long chain alcohols, ethylene glycol, propylene glycol, diethylene glycols, triethylene glycols, glycerine, dipropylene glycols, glycol butyl ethers, polyethylene glycols, polypropylene glycols, amides, ethers, carboxylic acids, esters, organosulfides, organosulfoxides, sulfones, alcohol derivatives, carbitol, butyl carbitol, cellosolve, ether derivatives, amino alcohols, and ketones. For example, co-solvents can include primary aliphatic alcohols of 30 carbons or less, primary aromatic alcohols of 30 carbons or less, secondary aliphatic alcohols of 30 carbons or less, secondary aromatic alcohols of 30 carbons or less, 1,2-diols of 30 carbons or less, 1,3-diols of 30 carbons or less, 1,5-diols of 30 carbons or less, ethylene glycol alkyl ethers, propylene glycol alkyl ethers, poly(ethylene glycol) alkyl ethers, higher homologs of poly(ethylene glycol) alkyl ethers, poly(propylene glycol) alkyl ethers, higher homologs of poly(propylene glycol) alkyl ethers, lactams, substituted formamides, unsubstituted formamides, substituted acetamides, and unsubstituted acetamides.

In some examples, the co-solvent is selected from the group comprising 1,5-pentanediol, 2-pyrrolidone, 2-ethyl-2-hydroxymethyl-1,3-propanediol, diethylene glycol, ethoxylated glycerol, 3-methoxybutanol, 1,3-dimethyl-2-imidazolidinone, or derivatives thereof.

In some examples, the co-solvent is selected from the group comprising diethylene glycol, dipropylene glycol, tetraethylene glycol, 1,5-pentanediol, 2-pyrrolidone, 2-methyl-2,4-pentanediol, 2-methyl-1,3-propanediol, 2-ethyl-2-hydroxymethyl-1,3-propanediol, 3-methoxybutanol, propylene glycol monobutyl ether, and 1,3-dimethyl-2-imidazolidinone.

Co-solvents may be added to reduce the rate of evaporation of water in the varnish to minimize clogging or to adjust other properties of the ink such as viscosity, pH, and surface tension.

Surfactant

In some examples, the varnish composition further comprises a surfactant. Examples of suitable surfactants include alkyl polyethylene oxides, alkyl phenyl polyethylene oxides, polyethylene oxide block copolymers, acetylene polyethylene oxides, polyethylene oxide (di)esters, polyethylene oxide amines, protonated polyethylene oxide amines, protonated polyethylene oxide amides, substituted amine oxides, polyethylene oxide alkyl sulfonates, polyethylene oxide alkyl sulfates, polyethylene oxide alkyl phosphates, and the like, as well as fluorocarbon and silicone (e.g. polysiloxane) surfactants. Examples of commercially available materials that may be used to provide the surfactants include Surfynol™ 420, Surfynol™ 440, Surfynol™ 104, Surfynol™ 107L, Surfynol™ 104PG50, Surfynol™ 465, Surfynol™ 485, Syrfynol™ 2502 available from Air Product™ (acetylene polyethylene oxide surfactants); BYK™ 307, BYK™ 333, BYK™ 348, BYK™ 378, BYK™ 3400, BYK™ 3410, BYK™ 3455 available from BYK Chemie™ (polysiloxane surfactants); TEGO™ wet 500, TEGO™ wet 240, TEGO™ twin 4100 available from Evonic™ (polysiloxane surfactants); DX4000, DX4005N, DX4010N available from Dynax™ fluorochemicals (fluorocarbon surfactants); and Capstone® FS-35, Capstone® FS-30, Capstone® FS-34, Capstone® FS-50 (fluorocarbon surfactants) available from Dupont™.

In some examples, the surfactant comprises an acetylene polyethylene oxide surfactant (such as Surfynol™ 420, Surfynol™ 440, Surfynol™ 104, Surfynol™ 107L, Surfynol™ 104PG50, Surfynol™ 465, Surfynol™ 485, Syrfynol™ 2502 available from Air Product™).

In some examples, the surfactant comprises a silicone surfactant (such as BYK™ 307, BYK™ 333, BYK™ 348, BYK™ 378, BYK™ 3400, BYK™ 3410, BYK™ 3455 available from BYK Chemie™; or TEGO™ wet 500, TEGO™ wet 240, TEGO™ twin 4100 available from Evonic™).

In some examples, the surfactant comprises a fluorocarbon surfactant (such as DX4000, DX4005N, DX4010N available from Dynax™ fluorochemicals; or Capstone® FS-35, Capstone® FS-30, Capstone® FS-34, Capstone® FS-50 (fluorocarbon surfactants) available from Dupont™).

In some examples, the surfactant comprises a silicone surfactant, an acetylene polyethylene oxide surfactant, a fluorocarbon surfactant, or combinations thereof.

In some examples, the surfactant comprises a silicone surfactant and an acetylene polyethylene oxide surfactant.

The varnish composition may include a surfactant in an amount of about 0.1 wt % to about 5 wt % by total solids of the composition, for example about 0.5 wt % to about 5 wt % by total solids of the composition.

In some examples, the varnish composition comprises surfactant from about 0.1 wt % to about 2 wt % by total weight of the composition, for example from about 0.5 wt % to about 1 wt % by total weight of the composition.

Wax

In some examples, the varnish composition further comprises a wax. Examples of suitable waxes include polyolefin waxes (e.g. polyethylene or polypropylene waxes) and Teflon™ waxes. In some examples, the wax is provided as a polyolefin (e.g. polyethylene or polypropylene) aqueous dispersion.

Examples of suitable waxes include polyolefin waxes: Aquacer™ 517, 1547, 8021, 8086, 8500, 8517, 8527, 1031, 593 available from BYK™; Liquilube™ 405 available from Lubrizol™ Company, Jonwax™ 35 from BASF™; Ultralube™ E842N, E850, E854, E912 available from Keim Additec Surface™. Examples of suitable waxes include teflon waxes: Lanco 1796 available from Lubrizol™ Company, Aquacer™ 130 RC1174 available from BYK™, Fluon AD605E, AD309E available from AGC™ chemicals.

In some examples, the varnish composition may comprise wax from about 0.1 wt % to about 5 wt % by total weight of the composition, for example, from about 0.5 wt % to about 3 wt % by total weight of the composition.

In some examples, wax may constitute from about 0.1 wt % to about 10 wt %, for example about 1 wt % to about 10 wt %, about 1 wt % to about 5 wt % by total solids of the composition.

Other Additives

The varnish may also contain buffering agents, biocides, viscosity modifiers, sequestering agents, stabilizing agents, humectants, and combinations thereof.

Typical buffering agents include such pH control solutions as hydroxides of alkali metals and amines, such as lithium hydroxide, sodium hydroxide, potassium hydroxide; citric acid; amines such as triethanolamine, diethanolamine, and dimethylethanolamine; and other basic or acidic components. If used, buffering agents typically comprise less than about 10 wt % of the ink-jet varnish composition.

Biocides can be used to inhibit growth of undesirable microorganisms. Several non-limiting examples of suitable biocides include benzoate salts, sorbate salts, commercial products such as NUOSEPT.R™, UCARCIDE.™, VANCIDE.R™, and PROXEL.™ and other known biocides. Typically, such biocides comprise less than about 5 wt % of the ink-jet varnish composition and often from about 0.05 wt % to about 2 wt %.

Printing Method

Described herein is a printing method comprising jetting a piezo-jettable varnish composition onto a print substrate to provide a varnish layer on the print substrate.

Jetting (e.g. digitally jetting) a piezo-jettable varnish composition onto a print substrate may comprise using an inkjet printing apparatus (such as a piezo-electric printing apparatus, e.g. a piezo-electric inkjet head such as X2 type from HP Scitex™) to provide a varnish layer on the print substrate. For example, the varnish composition may be jetted onto a print substrate using a piezo-inkjet printing apparatus.

In some examples the method comprises providing a printed substrate comprising a print substrate on which a printed image is disposed, and jetting the varnish composition onto the printed substrate to form a varnish later disposed on the printed image. In some examples, the printed substrate may be provided by jetting an inkjet ink composition onto a print substrate, for example using a piezo-inkjet printing apparatus. The inkjet ink composition may be ink composition suitable for inkjet printing, such as water-based inkjet inks, UV-curable inkjet inks and solvent-based inkjet inks. In some examples, the inkjet ink composition comprises a latex polymer, a colorant, water and a co-solvent. In some examples, the inkjet ink composition is a piezo-jettable ink composition and is piezo-jetted onto the print substrate to provide a printed image.

In some examples, the method comprises using a printing system to jet an inkjet ink composition onto a print substrate to form a printed image on the print substrate (i.e. a printed substrate) and then using the printing system to jet the varnish composition onto the printed substrate to form a varnish layer disposed on the printed image disposed on the printed substrate.

In some examples, the printing method comprises providing a print substrate. The print substrate may be any print substrate suitable for receiving a printed image, for example an inkjet printed image.

The present inventors have found that the varnish composition described herein may be particularly useful for varnishing images printed on packaging materials, such as corrugated boards (for example singled faced, single walled, double walled or triple walled corrugated boards in which the liner may be coated or uncoated). In some examples, the print substrate is a material having sufficient strength and flexibility to be suitable as a packaging material. For example, the print substrate may be a corrugated board (e.g. cardboard).

Piezo-Actuatable Printhead

Described herein is a piezo-actuatable printhead comprising a fluid chamber comprising a piezo-jettable varnish composition; and an orifice in fluid communication with the fluid chamber such that the varnish composition is jettable from the orifice. In some examples, the piezo-actuatable printhead comprises an actuator formed from a piezoelectric material for jetting the varnish composition from the orifice.

Figure 2:
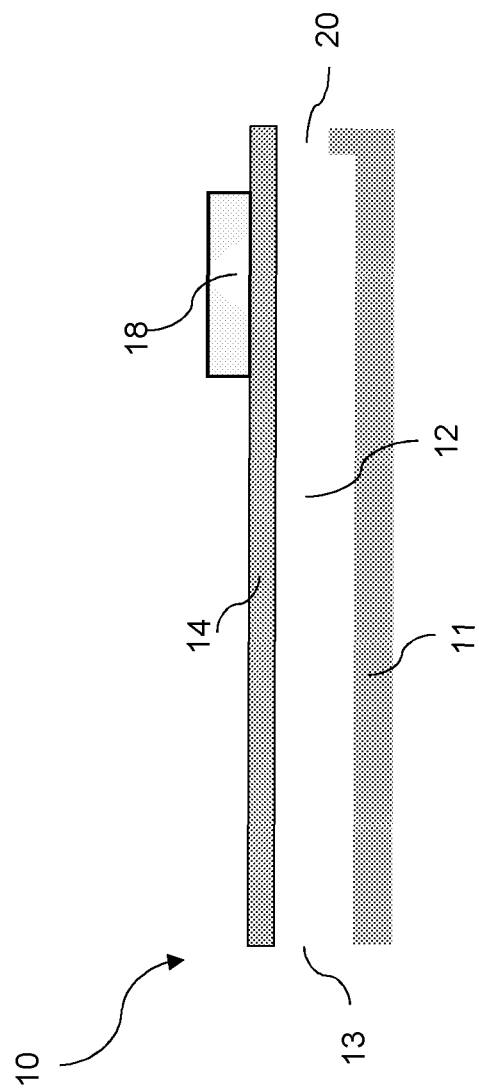
FIG. 2 is a schematic diagram of a piezo-actuatable printhead.

FIG. 2 shows a schematic diagram of a piezo-actuatable printhead 10. The piezo-actuatable printhead 10 comprises a fluid chamber 12 which may comprise a piezo-jettable varnish composition, and an orifice 20 in fluid communication with the fluid chamber 12 such that the varnish composition may be jetted from the orifice 20. The fluid chamber 12 of the piezo-actuatable printhead 10 may be defined by a substrate 11 and a flexible membrane 14. The flexible membrane 14 may be supported over the fluid chamber 12. The piezo-actuatable printhead 10 may also comprise an actuator 18 which may be disposed on the flexible membrane 14. The actuator 18 may comprise a piezoelectric material which deforms when an electrical voltage is applied. When the piezoelectric material deforms, the flexible membrane 14 deflects causing ejection of the varnish composition from the fluid chamber 12 through the orifice 20. Varnish composition may flow into the fluid chamber 12, e.g. from a varnish tank (not shown), through the fluid chamber inlet 13.

EXAMPLES

The following illustrates examples of the compositions and related aspects described herein. Thus, these examples should not be considered to restrict the present disclosure, but are merely in place to teach how to make examples of compositions of the present disclosure.

Examples 1-12

Varnish compositions were prepared by combining a latex polymer (a water insoluble acrylic resin in the form of an aqueous dispersion was provided in order to provide the latex polymer, examples of suitable acrylic resin dispersions include Joncryl 74-A™, Joncryl 77™, Joncryl 80™, Joncryl 89™, Joncryl 537™, Joncryl 538™, Joncryl 585™, Joncryl 624™, Joncryl 660™, and Joncryl 631™, available from BASF™) with a co-solvent (dipropylenglycol). Water was added to the mixture followed by a polymeric salt (an aqueous solution comprising an alkali-neutralised styrene-acrylic resin was used in order to provide the polymeric salt, examples of suitable aqueous solutions comprising styrene-acrylic resin salts include Joncryl™ 50, Joncryl™ 60, Joncryl™ 61, Joncryl™ 62, Joncryl™ 63, Joncryl™ ECO 75, Joncryl™ HPD 71 and Joncryl™ HPD 96 available from BASF™) A wax (a polyethylene wax in the form of a wax emulsion was provided in order to provide the wax, examples of suitable polyethylene wax emulsions include Aquacer™ 517, 1547, 8021, 8086, 8500, 8517, 8527, 1031 available from BYK™; Liquilube™ 405 available from Lubrizol™ Company, Jonwax™ 35 from BASF™; Ultralube™ E842N, E850, E854, E912 available from Keim Additec Surface™) and then a first surfactant (an acetylene polyethylene oxide surfactant, examples of suitable acetylene polyethylene oxide surfactants include Surfynol™ 420, Surfynol™ 440, Surfynol™ 104, Surfynol™ 107L, Surfynol™ 104PG50, Surfynol™ 465, Surfynol™ 485, Syrfynol™ 2502 available from Air Product™) and a second surfactant (a polysiloxane surfactant such as BYK™ 307, BYK™ 333, BYK™ 348, BYK™ 378, BYK™ 3400, BYK™ 3410, BYK™ 3455 available from BYK Chemie™) and optionally a third surfactant (a fluorocarbon surfactant such as DX4000, DX4005N, DX4010N available from Dynax™ fluorochemicals) were then added to the mixture. The amounts of each component (all amounts expressed in terms of wt % of particular component by total weight of the composition) included in each varnish composition is set out in Table 1 below with the balance being water. The composition was mixed and filtered using a 1 micron absolute filter to provide the varnish compositions to be tested.

Table 1 below also provides the viscosity at 25° C. and the surface tension at 25° C. of each of the varnish compositions.

The viscosity of the varnish compositions was determined using a HAAKE RS-600 rheometer (Thermo Electron, Newington N.H.) and a TCP/P Peltier controlled unit (Thermo Electron). The viscosity was measured at a temperature of 25° C. and the results recorded at two shear rates of 500 l/s and 4000 l/s, the average of these two values is recorded in Table 1.

The surface tension of the varnish compositions was determined using a K-11 Force Tensiometer (Kruss, Hamburg, Germany) at 25° C.

TABLE 1

| Example (Ex)/ Comparative Example (C. Ex) | Components of formulation | | | | | | | | | | |
|---|---|---|---|---|---|---|---|---|---|---|---|
| | Latex polymer (wt %) | Polymeric salt (wt %) | Co-solvent (wt %) | 1st Surfactant- (wt %) | 2nd Surfactant- (wt %) | 3rd Surfactant (wt %) | Wax (wt %) | Ratio latex polymer to polymeric salt | Viscosity at 25° C. (cps) | Surface tension (dyne/cm²) | Decap (min) |
| Ex. 1 | 13 | 5 | 20 | 0.3 | 0.2 | | 1 | 2.6:1 | 9 | 32 | 10 |
| C. Ex. 2 | 8 | 10 | 20 | 0.3 | 0.2 | | 1 | 0.8:1 | 12 | 31.8 | <1 |
| Ex. 3 | 13 | 5 | 20 | 0.3 | 0.2 | | 1 | 2.6:1 | 8.5 | 32.3 | 10 |
| Ex. 4 | 8 | 10 | 20 | 0.3 | 0.2 | | 1 | 0.8:1 | 12.5 | 32 | <1 |
| Ex. 5 | 13 | 5 | 20 | 0.3 | 0.2 | | 0 | 2.6:1 | 8.5 | 32.5 | 10 |
| Ex. 6 | 10 | 7 | 20 | 0.3 | 0.2 | | 1 | 1.4:1 | 10.2 | 31.8 | 1 |
| Ex. 7 | 12 | 6 | 20 | 0.3 | 0.2 | | 1 | 2:1 | 9 | 32 | 5 |
| Ex. 8 | 13 | 5 | 20 | 0.3 | 0.2 | 0.3 | 1 | 2.6:1 | 8.5 | 28 | 10 |
| Ex. 9 | 13.8 | 4.2 | 20 | 0.3 | 0.2 | | 1 | 3.3:1 | 8.8 | 32.2 | 7 |
| Ex. 10 | 14.2 | 3.8 | 20 | 0.3 | 0.2 | | 1 | 3.7:1 | 9.2 | 32.5 | 3 |
| C. Ex. 11 | 0 | 14 | 20 | 0.3 | 0.2 | | 1 | 0:1 | 11 | 31.6 | <1 |
| Ex. 12 | 15.6 | 2.4 | 20 | 0.3 | 0.2 | | 1 | 6.5:1 | 9.4 | 32 | 2 |

Testing

Decap Performance

The decap performance of each of the varnish compositions listed in Table 1 was evaluated in order to determine the jettability of each of the compositions. Each of the compositions was printed using Piezo-electric inkjet head (X2 type from HP Scitex), the compositions were jetted on a XY plane (Z axis fixed) onto pH paper (Hydrion™ pH paper 3.0-5.5). pH paper was used in order to visualise the image (the compositions were transparent and had a pH of between 7 and 10). All 128 nozzles were printing. The printed image produced by each composition consisted of two lines of dots, each line printed by 64 nozzles. Each nozzle fires 100 drops, each drop having a volume of about 45 Pico-liter. The pen voltage set to 50V and the frequency was set to 5000 Hz. The print quality of the image was observed noting any missing dots caused by nozzles failing to fire.

Additional prints for each composition were then providing after the composition remained in the print head and the print head remained idle for time intervals of 1 min, 3 min, 5 min and 10 min. A new image was produced after each new time interval for each composition and the print quality evaluated, if more than 10 new missing nozzles were noted the test was stopped. The "decap" time recorded was the time interval reached before 10 new nozzles failed to fire after a new time interval for each varnish composition. The results are provided in the final column of Table 1 and illustrated in FIG. 1.

The present inventors have found that varnish compositions having a ratio of latex polymer to polymeric salt (water soluble polymeric salt) in the range of greater than about 1:1 to about 8:1 show improved decap performance, with compositions having this ratio in the range of about 2.3:1 to about 3:1 showing the most improved decap performance.

Durability

The present inventors also tested the durability of each of the varnish compositions listed in table 1 printed using a piezo-electric inkjet printing apparatus to provide a varnish layer on a print substrate. The varnish layers printed using the compositions of the Examples were found to provide a continuous film at ambient temperature (25° C.), i.e. without the need for additional heating to provide a film, for example a film to protect an under printed image.

The durability of the printed varnish layers were tested using the test described in ASTM D-5264. It was found that the compositions comprising wax showed improved durability compared to compositions in which no wax was present. It was also found that compositions containing latex polymer and a polymeric salt showed improved durability compared to compositions containing no latex polymers.

The present inventors have found that the varnish compositions described herein may be selectively applied to a printed image on a print substrate and provide excellent durability to the printed image.

Tests were also undertaken to compare the durability of the digital varnish composition described herein (the piezo-jettable varnish composition) with the durability of a conventional analogue varnish composition (Siegwerk™ High gloss OPV Unilac). The samples tested were provided by jetting piezo-jettable composition described herein onto a print substrate, the analogue varnish was applied by roller coating. The printed samples were tested using the Sutherland abrasion test (as described in ASTM D-5264) for 500 cycles and were found to show similar durability.

While the varnish compositions, methods and related aspects have been described with reference to certain examples, it will be appreciated that various modifications, changes, omissions, and substitutions can be made without departing from the spirit of the disclosure. It is intended, therefore, that the varnish compositions, methods and related aspects be limited only by the scope of the following claims. Unless otherwise stated, the features of any dependent claim can be combined with the features of any of the other dependent claims, and any other independent claim.

The invention claimed is:

1. A piezo-jettable varnish composition comprising:
   a latex polymer having a weight averaged molecular weight Mw of greater than 50 000;
   a polymeric salt derived from an acidic polymer having a weight averaged molecular weight Mw in the range of 1000 to 50 000;
   water; and
   a co-solvent,
   wherein, the latex polymer and polymeric salt are present in amounts such that the ratio of latex polymer to polymeric salt by weight is in the range of greater than 1:1 to 8:1;
   wherein the varnish composition has a total solids content in the range of 10 wt % to 50 wt %;
   and wherein the varnish composition further comprises:
   0.5 wt % to 5 wt % surfactant;
   1 wt % to 10 wt % wax;
   10 wt % to 85 wt % of the latex polymer; and
   5 wt % to 50 wt % of the polymeric salt,
   by total solids.

2. The varnish composition according to claim 1, wherein the polymeric salt is derived from an acidic polymer having an acid number of greater than 100 mg KOH/g.

3. The varnish composition according to claim 1, wherein the latex polymer and polymeric salt are present in amounts such that the ratio of latex polymer to polymeric salt by weight is in the range of 1.5:1 to 4:1, or the latex polymer and polymeric salt are present in amounts such that the ratio of latex polymer to polymeric salt by weight is in the range of 2.3:1 to 3:1.

4. The varnish composition according to claim 1, wherein the latex polymer is an acrylic latex polymer and/or the acidic polymer is an acrylic polymer.

5. The varnish composition according to claim 1, wherein the varnish composition has a minimum film formation temperature in the range of 10° C. to 30° C.

6. The varnish composition according to claim 1, wherein the latex polymer has a weight averaged molecular weight Mw in the range of greater than 50 000 to 250 000, and the acidic polymer has a weight averaged molecular weight Mw in the range of 1000 to 25 000.

7. A piezo-jettable varnish composition comprising:
   a latex polymer having a weight averaged molecular weight Mw of greater than 50 000;
   a polymeric salt derived from an acidic polymer having a weight averaged molecular weight Mw in the range of 1000 to 50 000;
   water; and
   a co-solvent,
   wherein, the latex polymer and polymeric salt are present in amounts such that the ratio of latex polymer to polymeric salt by weight is in the range of greater than 1:1 to 8:1;
   and wherein the varnish composition further comprises:
   0.1 wt % to 2 wt % surfactant;
   0.1 wt % to 5 wt % wax;
   5 wt % to 45 wt % of the latex polymer;
   1 wt % to 25 wt % of the polymeric salt;
   40 wt % to 90 wt % of the water; and
   2 wt % to 60 wt % of the co-solvent,
   by total weight of the composition.

8. A printing method comprising:
   providing a printed substrate comprising a print substrate on which a printed image is disposed;
   providing a piezo-jettable varnish composition;
   jetting the piezo-jettable varnish composition onto the printed substrate to provide a varnish layer disposed on the printed image,
   wherein the piezo-jettable varnish composition comprises:
   a latex polymer having a weight averaged molecular weight Mw of greater than 50 000;
   a polymeric salt derived from an acidic polymer having a weight averaged molecular weight Mw in the range of 1000 to 50 000;
   water; and
   a co-solvent,
   wherein, the latex polymer and polymeric salt are present in amounts such that the ratio of latex polymer to polymeric salt by weight is in the range of greater than 1:1 to 8:1;
   and wherein the varnish composition further comprises:
   0.1 wt % to 2 wt % surfactant;
   0.1 wt % to 5 wt % wax;
   5 wt % to 45 wt % of the latex polymer;
   1 wt % to 25 wt % of the polymeric salt;
   40 wt % to 90 wt % of the water; and
   2 wt % to 60 wt % of the co-solvent,
   by total weight of the composition.

9. The printing method according to claim 8, wherein providing the printed substrate comprises jetting an inkjet ink composition onto the print substrate.

10. The printing method according to claim 8, wherein the print substrate comprises a corrugated board.

11. A piezo-actuatable printhead comprising:
- a fluid chamber comprising a piezo-jettable varnish composition; and
- an orifice in fluid communication with the fluid chamber such that the varnish composition is jettable from the orifice,
- wherein, the piezo-jettable varnish composition comprises:
  - a latex polymer having a weight averaged molecular weight Mw of greater than 50 000;
  - a polymeric salt derived from an acidic polymer having a weight averaged molecular weight Mw in the range of 1000 to 50 000;
  - water; and
  - a co-solvent,
- wherein, the latex polymer and polymeric salt are present in amounts such that the ratio of latex polymer to polymeric salt by weight is in the range of greater than 1:1 to 8:1;
- and wherein the varnish composition further comprises:
  - 0.1 wt % to 2 wt % surfactant;
  - 0.1 wt % to 5 wt % wax;
  - 5 wt % to 45 wt % of the latex polymer;
  - 1 wt % to 25 wt % of the polymeric salt;
  - 40 wt % to 90 wt % of the water; and
  - 2 wt % to 60 wt % of the co-solvent,
  - by total weight of the composition.

\* \* \* \* \*